(12) United States Patent
Rose et al.

(10) Patent No.: US 11,840,285 B2
(45) Date of Patent: Dec. 12, 2023

(54) ACTIVE SPOILER

(71) Applicant: Honda Motor Co., Ltd., Tokyo (JP)

(72) Inventors: David J. Rose, West Mansfield, OH (US); Matthew L Metka, Plain City, OH (US); Pratap T. Rao, Columbus, OH (US); Connor Torris, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 17/352,591

(22) Filed: Jun. 21, 2021

(65) Prior Publication Data

US 2022/0402564 A1 Dec. 22, 2022

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC ............... B62D 35/007; B62D 37/02
See application file for complete search history.

(56) References Cited

U.S. PATENT DOCUMENTS

| | | | |
|---|---|---|---|
| 5,923,245 A | 7/1999 | Klatt et al. | |
| 7,607,717 B2 | 10/2009 | Browne et al. | |
| 8,308,222 B2 | 11/2012 | Ondracek | |
| 2016/0185400 A1* | 6/2016 | Martinus | B62D 35/001 |
| | | | 296/24.35 |
| 2022/0315134 A1* | 10/2022 | Moradnia | B62D 35/007 |
| 2022/0315135 A1* | 10/2022 | Moradnia | B62D 35/007 |

FOREIGN PATENT DOCUMENTS

| | | |
|---|---|---|
| DE | 19902289 B4 | 4/2008 |
| DE | 10063581 B4 | 5/2012 |
| DE | 10104752 B4 | 5/2013 |
| DE | 10102756 B4 | 9/2016 |
| WO | 2019233648 A1 | 12/2019 |

* cited by examiner

*Primary Examiner* — Lori Lyjak
(74) *Attorney, Agent, or Firm* — Plumsea Law Group, LLC (57) ABSTRACT

An active spoiler for a vehicle including a fixed portion configured for attachment to the vehicle, an extendable portion configured for movement relative to the fixed portion, and a flexible portion secured between the fixed portion and the extendable portion. The spoiler has a retracted configuration and an extended configuration, whereby the flexible portion is stowed within the spoiler in the retracted configuration and the flexible portion is deployed in the extended configuration.

20 Claims, 6 Drawing Sheets

ACTIVE SPOILER

BACKGROUND

The present disclosure relates to an active spoiler and more particularly, to an active spoiler that has a first configuration for slower vehicle speeds and a second configuration to reduce the drag force when driving at higher vehicle speeds.

As a vehicle moves in forward motion, the air flowing past the vehicle can influence many aspects of the vehicle's performance including, for example, the drag force on the vehicle. When a vehicle first starts moving forward, the motor uses its power to begin the vehicle movement from a dead stop. However, once the vehicle is travelling at a higher speed, the motor must also then use its power to oppose the wind resistance that is encountered. Hence, reductions in the wind resistance can reduce the drag force on a moving vehicle and can improve the fuel efficiency of the vehicle.

As known in the art, a rear spoiler can be used on a vehicle to assist in reducing the drag force. As its name suggests, a spoiler "spoils" the unfavorable air movement over the rear of the vehicle and, as a result, the disruption in the air flow improves the overall aerodynamics of the vehicle. More particularly, many vehicles have a rather steep downward slope going from the rearward edge of the roofline to the trunk or rear of the vehicle which may result in air flow separation. This may cause the flow of air to become turbulent and create a low-pressure zone, thus increasing the drag force. The addition of a rear spoiler to a vehicle, in effect, creates a longer, gentler slope from the roofline to the spoiler, which interrupts the air flow separation and thereby reduces the drag force.

Thus, while rear spoilers can reduce drag resistance on a vehicle, conventional spoilers generally have a fixed geometry, location, and configuration and do not adapt to the changing driving conditions of the vehicle. Moreover, conventional fixed spoilers must also maintain a balance between preserving an aesthetic appeal on the vehicle and reducing the drag resistance.

There is therefore a need in the art for a spoiler system and method that can actively adapt to a change in driving conditions and, at the same time, provide an aesthetically pleasing look to the vehicle.

SUMMARY

The active spoiler according to the disclosure herein extends the effective roof line of a vehicle at a predetermined speed to improve the overall aerodynamic function of the vehicle, while still maintaining an aesthetically pleasing appearance when parked in a vehicle showroom or driving at lower speeds. Hence, the active spoiler herein has both a retracted configuration providing an aesthetically pleasing appearance and an extended configuration that reduces the drag coefficient and thereby improves the performance of the vehicle when traveling above a predetermined speed.

In one aspect, the disclosure provides a spoiler for a vehicle including a fixed portion configured for attachment to the vehicle, an extendable portion configured for movement relative to the fixed portion, and a flexible portion secured between the fixed portion and the extendable portion. The spoiler has a retracted configuration and an extended configuration, the flexible portion being stowed within the spoiler in the retracted configuration and the flexible portion being deployed in the extended configuration.

In another aspect, the disclosure provides a vehicle having an active rear spoiler including a first portion and a second portion, the active rear spoiler defining a first retracted state and a second extended state, and at least one rear stop lamp disposed on the second portion. The at least one rear stop lamp is positioned such that the at least one rear stop lamp is visible from a position rearward of the vehicle when the active rear spoiler is in the first retracted state and in the second extended state.

The disclosure also provides a system and method for reducing drag on a vehicle including providing a spoiler having a first retracted state and a second extended state, extending the spoiler from the first retracted state to the second extended state when the vehicle is travelling at a speed greater than a first predetermined speed, retracting the spoiler from the second extended state to the first retraced state when the vehicle is travelling at a speed less than a second predetermined speed, maintaining the spoiler in the first retracted state when the vehicle is travelling at a speed less than the first predetermined speed, and providing a visual indicator within an interior of the vehicle to inform a user whether the spoiler is in the first retracted state or the second extended state.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The active spoiler according to the disclosure herein dynamically adjusts while the vehicle is in operation based on the driving conditions presented, thereby varying the wind resistance effect and other performance characteristics of the vehicle. The active spoiler disclosed herein also offers cosmetic benefits over a fixed spoiler because it allows a cleaner appearance when the vehicle is parked or traveling at low speeds, when it is most likely to be observed. The ability to conceal a spoiler is also beneficial to designers seeking to improve the high-speed aerodynamic performance of a vehicle, without drastically changing its overall appearance.

The active spoiler according to the disclosure herein is retracted when the vehicle is not moving to give the vehicle the intended aesthetic appearance and the spoiler is extended while operating in a forward motion to reduce drag. To accomplish this, a flexible material similar to what is conventionally used for a convertible soft roof top is utilized. When retracted, the flexible material is not exposed, and the spoiler has a conventional spoiler appearance. When the vehicle is operating in forward motion above a predetermined speed, the spoiler is extended to thereby deploy the flexible material. Hence, while the flexible material is exposed during forward motion operation above the predetermined speed, appearance is not of paramount concern while driving at the higher speed since it is only seen in passing and not readily viewable.

Figure 1:
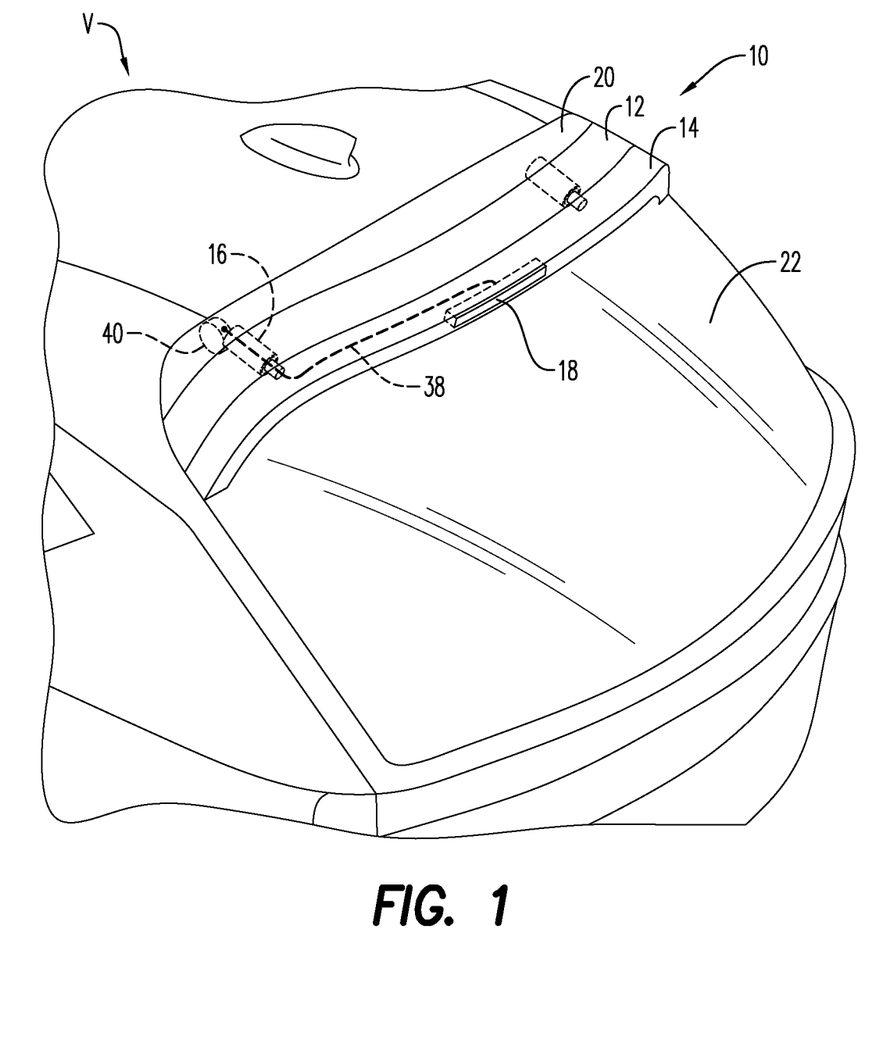
FIG. 1 is a perspective view of a vehicle with an active spoiler according to an exemplary embodiment of the disclosure, in a retracted state.
Figure 2A:
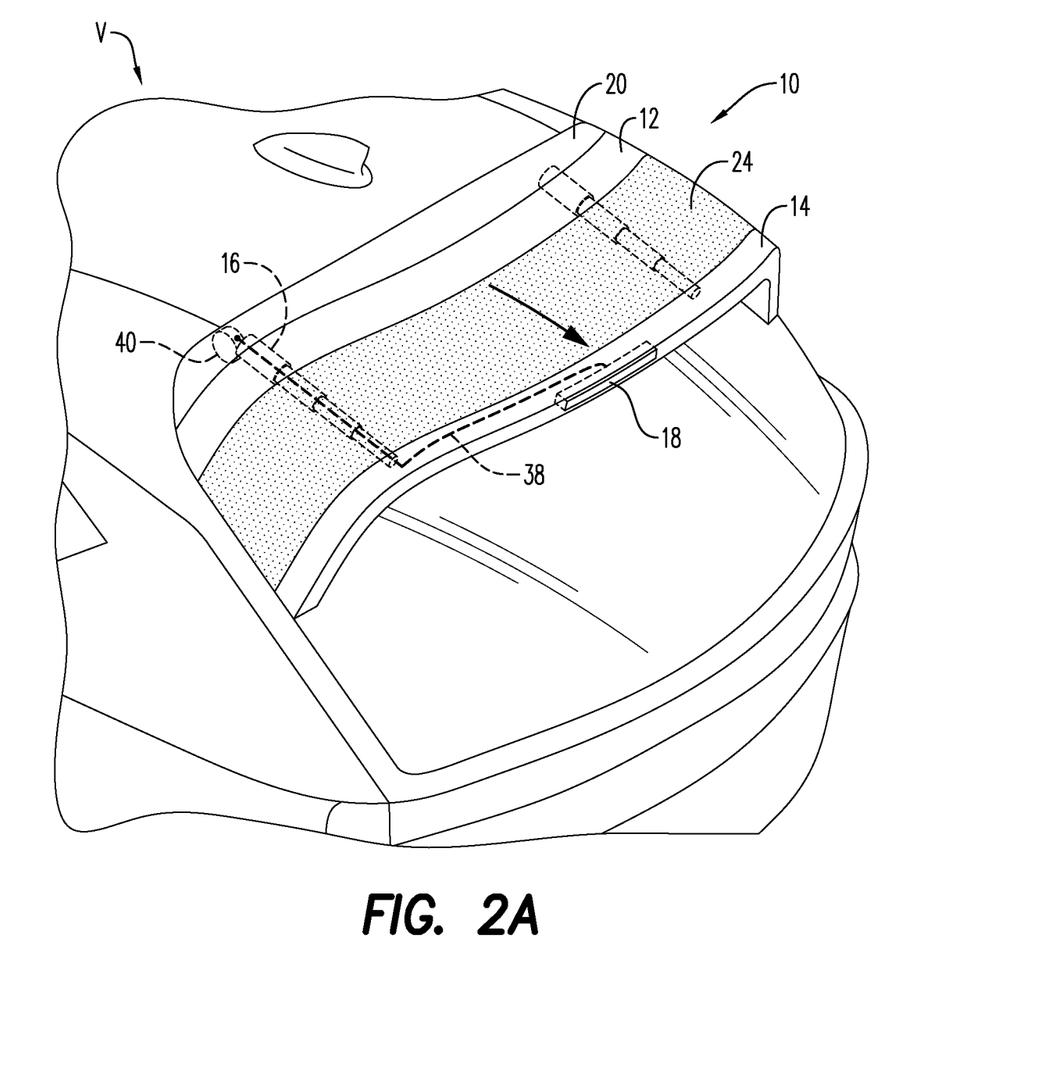
FIG. 2A is a perspective view of a vehicle with an active spoiler according to an exemplary embodiment of the disclosure, in an extended state.

Referring to FIGS. 1 and 2A, an active spoiler according to an exemplary embodiment of the disclosure is shown generally by reference numeral 10. The spoiler 10 is connected to vehicle V above the rear windshield 22. The spoiler 10 includes a fixed portion 12 connected to an upper edge of the tailgate 20 of the vehicle V and a moving or extendable portion 14 that moves outward relative to fixed portion 12. Between fixed portion 12 and moving portion 14 is a flexible portion 24. When the fixed portion 12 for the active spoiler 10 is mounted on the tailgate 20 of the vehicle V it enables the active spoiler 10 to move with the tailgate 20 when the tailgate is raised and lowered. Alternatively, if the vehicle 10 does not include a tailgate, the fixed portion 12 can be mounted on the rearward edge of the roof of the vehicle V.

In accordance with an exemplary embodiment, flexible portion 24 is a cloth or cloth-like material such as that commonly used for convertible soft roof tops. The material can be a composite made of, by way of example, an acrylic square weave or PVC outer fabric, a butyl rubber or elastomeric inner layer inner layer and a cotton drill or polyester/cotton lining fabric or any other flexible material capable of being retracted and extended in the rear spoiler according to the disclosure here.

The spoiler 10 is deployed from the retracted position to the extended position by a plurality of actuators 16, which may include a pair of telescoping cylinders, a motor driven linkage, or any other type of mechanism configured for the required extension movement. That is, the deployment of the spoiler may be achieved with an electric motor controlled automatically by the onboard computer or other electronics based on the vehicle speed, but could also be based on other driver settings or other inputs if appropriate. Alternatively, the driver may be able to manually deploy the spoiler if desired, but may or may not be able to retract the spoiler when driving above a given predetermined speed in order to avoid damage to the spoiler itself and diminishing the higher speed handling capabilities of the vehicle.

Figure 2B:
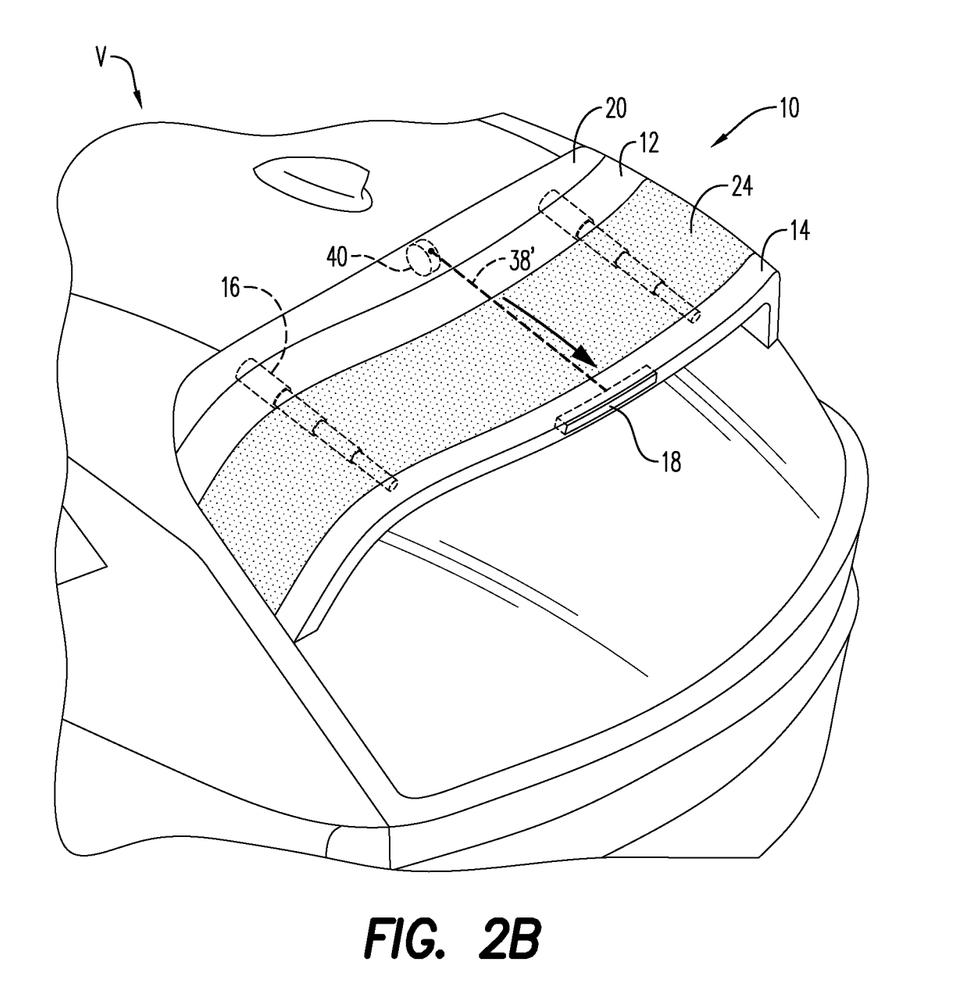
FIG. 2B is a perspective view of a vehicle with an active spoiler according to a further exemplary embodiment of the disclosure, in an extended state.

The active spoiler 10 further includes a rear center-mounted stop lamp 18 fixed to the rear of the extendable portion 14 of the spoiler. The stop lamp 18 is thus visible from behind the vehicle V when the spoiler 10 is in the retracted position as shown in FIG. 1 and when the spoiler 10 is in the extended position as shown in FIG. 2A. The stop lamp 18 is shown as a single light or lamp in the center of the extendable portion 14 in the exemplary embodiment, however, multiple distinct lamps or a plurality of lamps in one or more light bars could of course also be used if desired. An electric wire or cable 38 is provided to power the stop lamp 18. In one exemplary embodiment of the disclosure, the wire 38 extends through or along at least one of the actuators 16, i.e., through the telescoping cylinders. A tensioner 40 is also provided to feed out or unwind the wire 38 when the extendable portion 14 is deployed and to withdraw or wind-up the wire 38 when the extendable portion 14 is retracted. In a further exemplary embodiment as illustrated in FIG. 2B, a wire 38' is attached or intertwined with the material of flexible portion 24. A tensioner 40 is similarly provided to feed out or unwind the wire 38' when the extendable portion 14 is deployed and to withdraw or wind-up the wire 38' when the extendable portion 14 is retracted. Alternatively, the wire 38' can be configured to fold up with the fabric of the flexible portion 24 when the extendable portion 14 is retracted.

Figure 3:
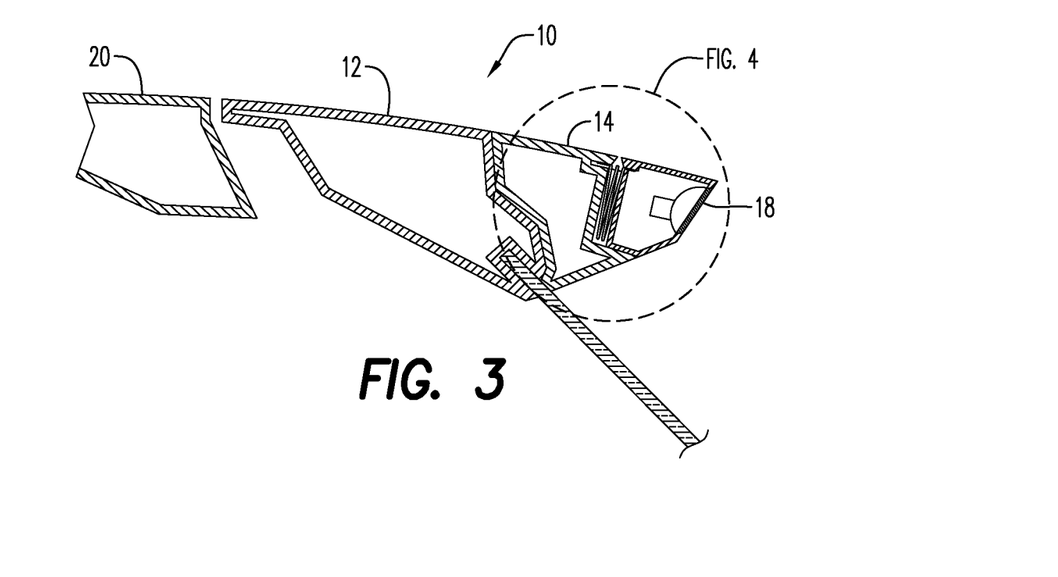
FIG. 3 is a cross section schematic through the active spoiler in the retracted stated shown in FIG. 1.
Figure 4:
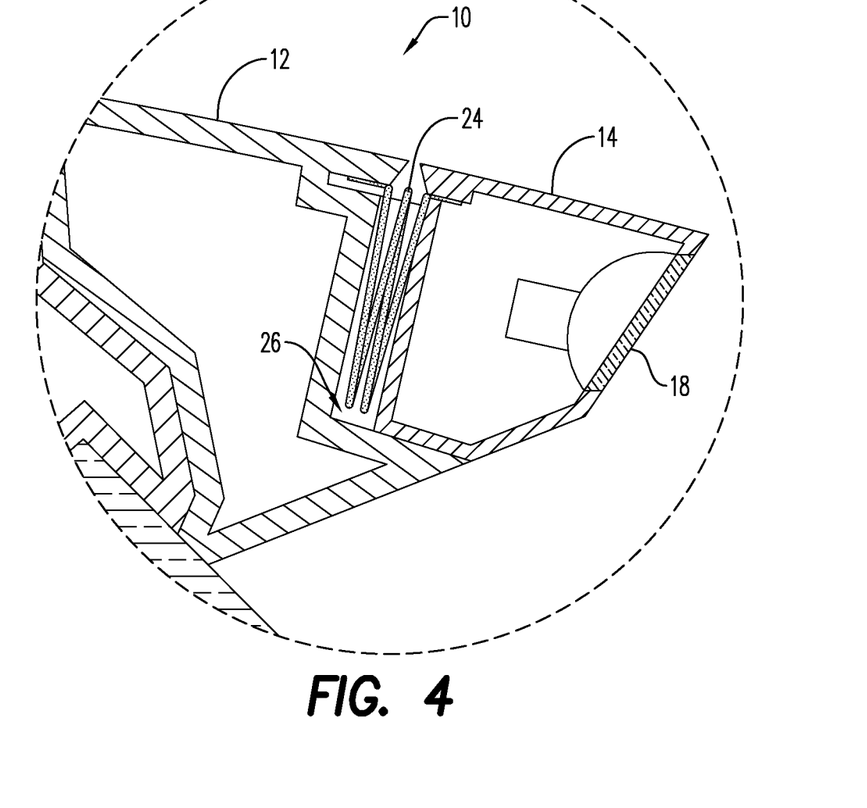
FIG. 4 is an enlarged detail of a portion of the active spoiler shown in FIG. 3.
Figure 5:
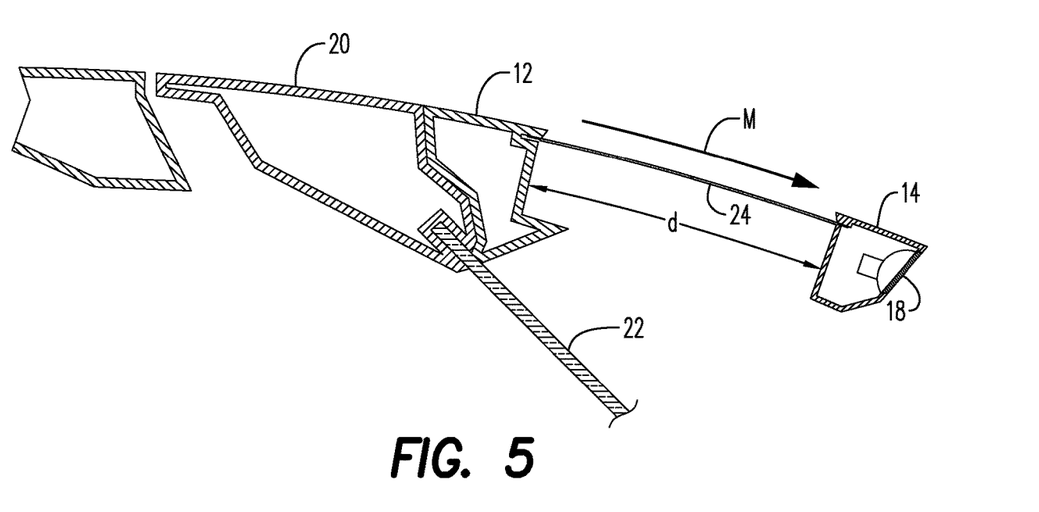
FIG. 5 is a cross section schematic through the active spoiler in the extended state shown in FIG. 2A.

In accordance with an exemplary embodiment, the actuators 16 are actuated automatically to deploy the spoiler 10 based upon the speed of the vehicle V, as discussed further below. Referring also to FIGS. 3 and 4, when in the retracted position, the material portion 24 is housed within a storage space 26 defined between the fixed portion 12 and the moving portion 14. In the exemplary embodiment of the disclosure, the material 24 is folded back and forth in an accordion fashion within the space 26 but other retracted configurations may also be possible, such as, for example, rolling the material portion 24 within the space 26. When the actuators 16 deploy the active spoiler 10, the moving portion 14 is moved rearwardly relative to the fixed portion 12 and the longitudinal axis of the vehicle. The moving portion 14 is extended along a line of movement M from the retracted position shown in FIG. 3 to the extended position shown in FIG. 5. As the moving portion 14 is extended, the material portion 24 is deployed from the space 26 and spans the distance between the fixed portion 12 and the moving portion 14. In the exemplary embodiment, the distance d between the moving portion 14 and the fixed portion 12 is on the order of 50 mm-280 mm, but other spans could of course be used depending upon the size and configuration of the vehicle. As noted above, in both the retraced configuration of FIG. 3 and the extended configuration of FIG. 5, the rear stop lamp 18 is positioned such that it will be visible from behind the vehicle V (the wire 38, 38' and tensioner 40 being removed for clarity in FIGS. 3-5).

In the deployed state, the material portion 24 defines an extended body of the active spoiler 10 which is advantageous to reduce aerodynamic drag and thereby increase the gas mileage obtained by the vehicle V. At the same time, when the spoiler 10 is in the retracted configuration and the material portion 24 is stowed within the space 26, the vehicle V retains an aesthetically pleasing design as it would be seen parked in a dealer showroom.

Figure 6A:
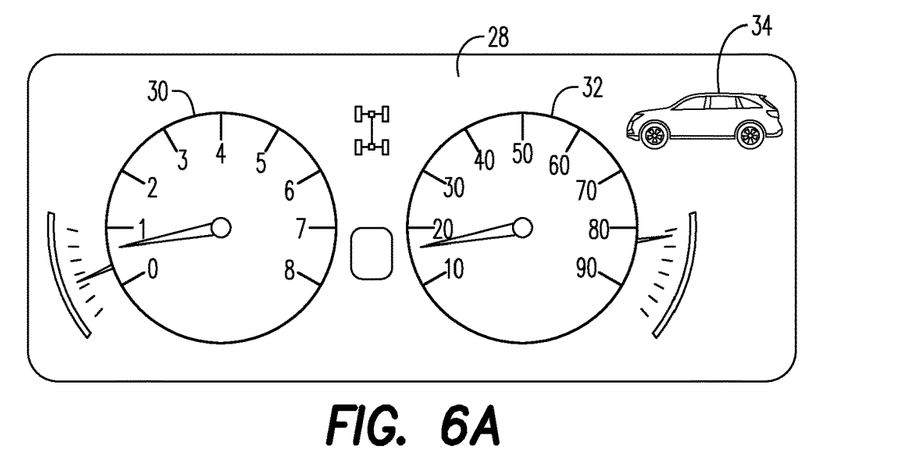
FIG. 6A is a schematic view of a dashboard display for a vehicle with the active spoiler according to an exemplary embodiment of the disclosure.
Figure 6B:
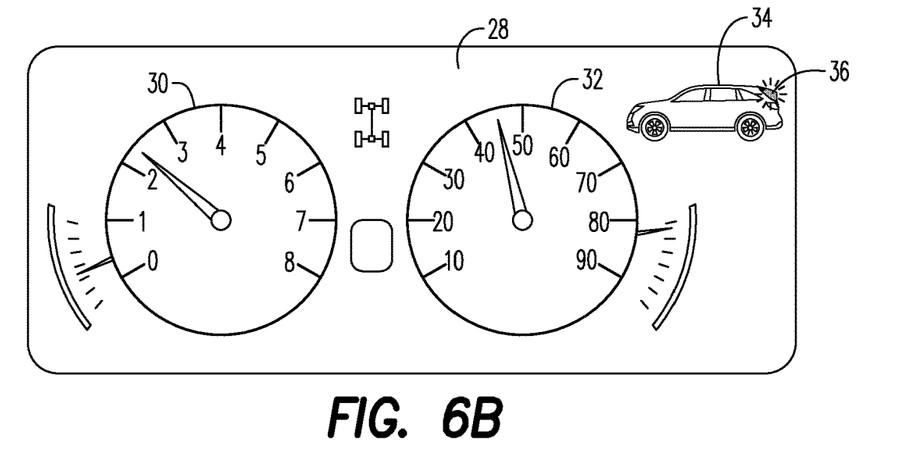
FIG. 6B is a further schematic view of a dashboard display for a vehicle with the active spoiler according to an exemplary embodiment of the disclosure.
Figure 6C:
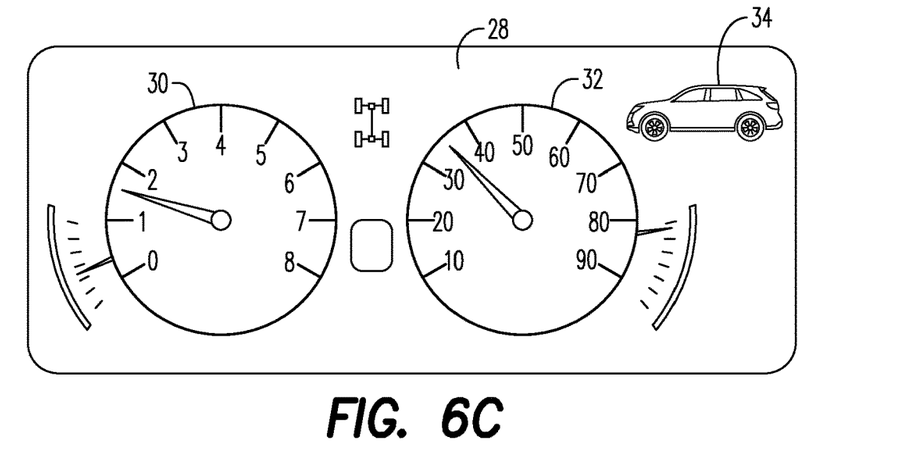
FIG. 6C is another schematic view of a dashboard display for a vehicle with the active spoiler according to an exemplary embodiment of the disclosure.

Referring next to FIGS. 6A-6C, the spoiler 10 is normally in a retracted state when the vehicle is parked or driving at a normal speed, the spoiler 10 is extended automatically in an exemplary embodiment of the disclosure when the vehicle is driven at a high speed, i.e., obtains a first predetermined speed, and is then retracted automatically when the speed of the vehicle decreases to a slower speed, i.e., below a second predetermined speed. The predetermined speeds at which extension and retraction occur may or may not be the same. FIG. 6A illustrates a typical dashboard display 28 for a vehicle which includes a tachometer 30 and a speedometer 32. The illustrated dashboard display is merely an example and fewer or additional indicators and gauges could also be provided. The dashboard display 28 further includes a visual image 34 for indicating to the driver when the spoiler 10 has been extended and retracted. The visual image 34 is shown in the form of a vehicle in the exemplary embodiment, but any type of image could of course be used such as, for example, words, images, graphic symbols, and the like. FIG. 6A illustrates that the vehicle is travelling approximately 15mph on the speedometer 32. At this speed, the spoiler 10 is in the retracted position in the exemplary embodiment and the visual image 34 is not activated.

Referring also to FIG. 6B, the speedometer 32 indicates that the vehicle is now travelling at a higher speed of approximately 45 mph. At this speed, the spoiler 10 has been extended in the exemplary embodiment and this is communicated to the driver by the activation of a visual indicator 36, such as the illumination of a light on the visual image 34. The visual indicator 36 is thus activated or turned on when the spoiler 10 begins to be extended when the vehicle has reached a first predetermined speed, such as, for example, the 45 mph shown in the exemplary embodiment. The visual indicator 36 is disposed on the rear of the visual image 34 in the exemplary embodiment corresponding to the approximate location where the spoiler 10 would be located on the vehicle. Other predetermined speeds could also be utilized as the selected speed at which the spoiler 10 is extended based upon the design, size, configuration and other factors of a particular vehicle and the disclosure here should not be limited to any particular speed. Similarly, the visual indicator 36 does not necessarily need to be on the rear of the visual image 34 depending upon the visual image that is selected and may correspond to any portion or an entirety of the visual image.

Referring also to FIG. 6C, the speedometer 32 indicates that the vehicle is now travelling at a speed of approximately 35 mph. At this speed, the spoiler 10 has been retracted in the exemplary embodiment and this is communicated to the driver by the visual indicator 36 being in an inactive state. The visual indicator 36 is thus turned off when the spoiler 10 is retracted as the vehicle has reached a second predetermined speed, such as, for example, the 35 mph shown in the exemplary embodiment. Other predetermined speeds could also be utilized as the selected speed at which the spoiler 10 is retracted based upon the design, size, configuration and other factors of a particular vehicle and the disclosure here should not be limited to any particular speed.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A spoiler for a vehicle comprising:
a fixed portion configured for attachment to the vehicle;
an extendable portion configured for movement relative to the fixed portion; and
a flexible portion secured between the fixed portion and the extendable portion;
wherein the spoiler has a retracted configuration and an extended configuration; and
wherein the flexible portion is stowed within the spoiler in the retracted configuration and the flexible portion is deployed in the extended configuration.

2. The spoiler according to claim 1, wherein the spoiler is separate and distinct from the vehicle.

3. The spoiler according to claim 1, wherein the flexible portion comprises a cloth material.

4. The spoiler according to claim 1, further comprising a plurality of actuators configured to move the extendable portion relative to the fixed portion.

5. The spoiler according to claim 1, wherein the flexible portion is configured to be deployed when the extendable portion is extended relative to the fixed portion such that the flexible portion spans a distance between the extendable portion and the fixed portion, and wherein the flexible portion is configured to be stowed when the extendable portion is retracted relative to the fixed portion such that the flexible portion is stowed within a storage space defined between the fixed portion and the extendable portion when in the retracted configuration.

6. The spoiler according to claim 1, further comprising at least one stop lamp disposed on a rear edge of the extendable portion, wherein the at least one stop lamp is visible on the extendable portion in both the retracted configuration and the extended configuration.

7. The spoiler according to claim 1, wherein the spoiler is configured to be extended at a first predetermined speed of the vehicle and retracted at a second predetermined speed of the vehicle.

8. A vehicle comprising:
an active rear spoiler including a first portion and a second portion, the active rear spoiler defining a first retracted state and a second extended state; and
at least one rear stop lamp disposed on the second portion;
wherein the at least one rear stop lamp is positioned such that the at least one rear stop lamp is visible from a position rearward of the vehicle when the active rear spoiler is in the first retracted state and in the second extended state.

9. The vehicle according to claim 8, wherein the first portion of the active rear spoiler is secured to the vehicle and the second portion of the active rear spoiler is extendable relative to the first portion.

10. The vehicle according to claim 9, wherein the active rear spoiler includes a flexible portion secured between the first portion and the second portion, wherein the flexible portion is stowed within the active rear spoiler in the first retracted state, and wherein the flexible portion is deployed in the second extended state.

11. The vehicle according to claim 10, wherein the active rear spoiler further includes a storage space defined between the first portion and the second portion when in the first retracted state, the flexible portion being stowed within the storage space when the active rear spoiler is in the first retracted state.

12. The vehicle according to claim 10, further comprising a plurality of actuators configured to move the second portion rearwardly relative to the first portion and a longitudinal axis of the vehicle.

13. The vehicle according to claim 12, further comprising a power supply cord for the at least one rear stop lamp disposed along at least one of the plurality of actuators, and a tensioner configured to feed out the power cord when the second portion is extended relative to the first portion and withdraw the power cord when the second portion is retracted relative to the first portion.

14. The vehicle according to claim 10, further comprising a power supply wire for the at least one rear stop lamp being secured to the flexible portion.

15. The vehicle according to claim 11, further comprising a visual indicator on a display within interior of the vehicle, the visual indicator being configured to inform a user whether the active rear spoiler is in the first retracted state or the second extended state.

16. A method for reducing drag on a vehicle comprising:
providing a spoiler having a first retracted state and a second extended state;
extending the spoiler from the first retracted state to the second extended state when the vehicle is travelling at a speed greater than a first predetermined speed;
retracting the spoiler from the second extended state to the first retraced state when the vehicle is travelling at a speed less than a second predetermined speed;
maintaining the spoiler in the first retracted state when the vehicle is travelling at a speed less than the first predetermined speed; and
providing a visual indicator within an interior of the vehicle to inform a user whether the spoiler is in the first retracted state or the second extended state.

17. The method according to claim 16, wherein providing the spoiler includes providing a fixed portion configured for attachment to the vehicle, an extendable portion configured for movement relative to the fixed portion, and a flexible portion secured between the fixed portion and the extendable portion.

18. The method according to claim 17, wherein extending the spoiler includes moving the extendable portion away from the fixed portion relative to a longitudinal axis of the vehicle, and thereby deploying the flexible portion such that the flexible portion spans a distance between the extendable portion and the fixed portion.

19. The method according to claim 18, wherein retracting the spoiler includes moving the extendable portion towards the fixed portion relative to the longitudinal axis of the vehicle, and thereby stowing the flexible portion such that the flexible portion is stowed within a storage space defined between the fixed portion and the extendable portion when in the first retracted state.

20. The method according to claim 16, wherein providing a visual indicator includes providing a visual image on a display within the interior of the vehicle and illuminating the visual image when the spoiler is in the second extended state.

* * * * *